US011126355B2

(12) United States Patent
Bode et al.

(10) Patent No.: US 11,126,355 B2
(45) Date of Patent: Sep. 21, 2021

(54) WRITE-BASED DATA MANAGEMENT USING ENDURANCE TIERS IN A STORAGE SYSTEM

(71) Applicant: International Business Machines Corporation, Armonk, NY (US)

(72) Inventors: Christopher C. Bode, Cary, NC (US); Nathan B. Best, Apex, NC (US); Abhishek Dhingra, Ghaziabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/798,107

(22) Filed: Feb. 21, 2020

(65) Prior Publication Data

US 2021/0263655 A1 Aug. 26, 2021

(51) Int. Cl.
*G06F 3/06* (2006.01)

(52) U.S. Cl.
CPC .......... *G06F 3/0616* (2013.01); *G06F 3/0634* (2013.01); *G06F 3/0679* (2013.01)

(58) Field of Classification Search
None
See application file for complete search history.

(56) References Cited

U.S. PATENT DOCUMENTS

| 9,524,109 B2 | 12/2016 | Lotem et al. | |
| 10,191,822 B2 | 1/2019 | Ware et al. | |
| 2009/0276588 A1* | 11/2009 | Murase | G06F 3/0647 711/160 |
| 2011/0010514 A1* | 1/2011 | Benhase | G06F 3/061 711/162 |
| 2014/0281121 A1* | 9/2014 | Karamcheti | G06F 9/4881 711/102 |
| 2018/0284997 A1* | 10/2018 | Dalmatov | G11C 16/349 |
| 2018/0321860 A1* | 11/2018 | Marchenko | G06F 12/08 |

OTHER PUBLICATIONS

Wei, "Effectively Use Solid State Drives in Multi-tiered Storage Systems," Master's Thesis, Dec. 2012, Northeastern University, 56 pages.
"HPE MSA 1050-2050-2052: Best practices," Hewlett Packard Enterprise,Technical white paper, Jul. 2019, 52 pages.
"Implementing the IBM Storwize V5000: Chapter 9: Easy Tier," IBM Redbooks, 2013, pp. 412-628.
"A method to improve the overall write endurance of multiple SSDs in storage facilities," IP com, Dec. 2, 2013, 7 pages.
"Method to improve Flash utilization in multi-tiered systems," IP.com, Jul. 17, 2018, 7 pages.
"Write Amplification improvement through Data localization in 3D stacked NAND-Flash," IP.com, Sep. 12, 2018, 7 pages.

* cited by examiner

*Primary Examiner* — Jane Wei
(74) *Attorney, Agent, or Firm* — Yee & Associates, P.C.

(57) ABSTRACT

A method, system, and computer program product manages a storage system. Writes to sections in solid state storage devices in endurance tiers in the storage system are monitored by a computer system over a period of time. Responsive to a write rate for the writes to a section in the sections in an current endurance tier in the endurance tiers exceeding a maximum recommended write rate for the current endurance tier during the period of time, data is moved from the section in the current endurance tier to a higher endurance tier in the endurance tiers having a higher maximum recommended write rate than the maximum recommended write rate for the current endurance tier.

17 Claims, 5 Drawing Sheets

WRITE-BASED DATA MANAGEMENT USING ENDURANCE TIERS IN A STORAGE SYSTEM

BACKGROUND

1. Field

The disclosure relates generally to an improved computer system and, more specifically, to a method, apparatus, computer system, and computer program product to manage data written to a storage system.

2. Description of the Related Art

Solid state storage devices are commonly used for data operations involving storage devices that require high input and output performance. Solid state storage devices can have high performance advantages over drives using spinning discs when workloads include random read and write patterns.

Solid state storage devices can include, for example, solid state drives, flash drives, and other similar devices. Many of these devices include memory comprised of NAND gates. With this technology, solid state storage devices will last for a period of time specified by the manufacturer when the solid state storage devices are written to a rate that is not greater than a manufacturer's specification.

SUMMARY

According to one embodiment of the present invention, a method manages a storage system. Writes to sections in solid state storage devices in endurance tiers in the storage system are monitored by a computer system over a period of time. Responsive to a write rate for the writes to a section in the sections in an current endurance tier in the endurance tiers exceeding a maximum recommended write rate for the current endurance tier during the period of time, data is moved by the computer system from the section in the current endurance tier to a higher endurance tier in the endurance tiers having a higher maximum recommended write rate than the maximum recommended write rate for the current endurance tier.

According to another embodiment of the present invention, a storage management system comprises a computer system that monitors writes to sections in solid state storage devices in endurance tiers of in a storage system over a period of time. Responsive to a write rate for the writes to a section in the sections in an current endurance tier in the endurance tiers exceeding a maximum recommended write rate for the current endurance tier during the period of time, the computer system moves data from the section in the current endurance tier to a higher endurance tier in the endurance tiers having a higher maximum recommended write rate than the maximum recommended write rate for the current endurance tier.

According to yet another embodiment of the present invention, a computer program product for managing a storage system comprises a computer-readable-storage media with first program code and second program code stored on the computer-readable storage media. The first program code is executable by a computer system to cause the computer system to monitor writes to sections in solid state storage devices in endurance tiers of in the storage system over a period of time. The second program code is executable by a computer system to cause the computer system to move data from a section in the sections in a current endurance tier to a higher endurance tier in the endurance tiers having a higher maximum recommended write rate than a maximum recommended write rate for the current endurance tier in response to the write rate for the writes to the section exceeding the maximum recommended write rate for the current endurance tier during the period of time.

DETAILED DESCRIPTION

Figure 1:
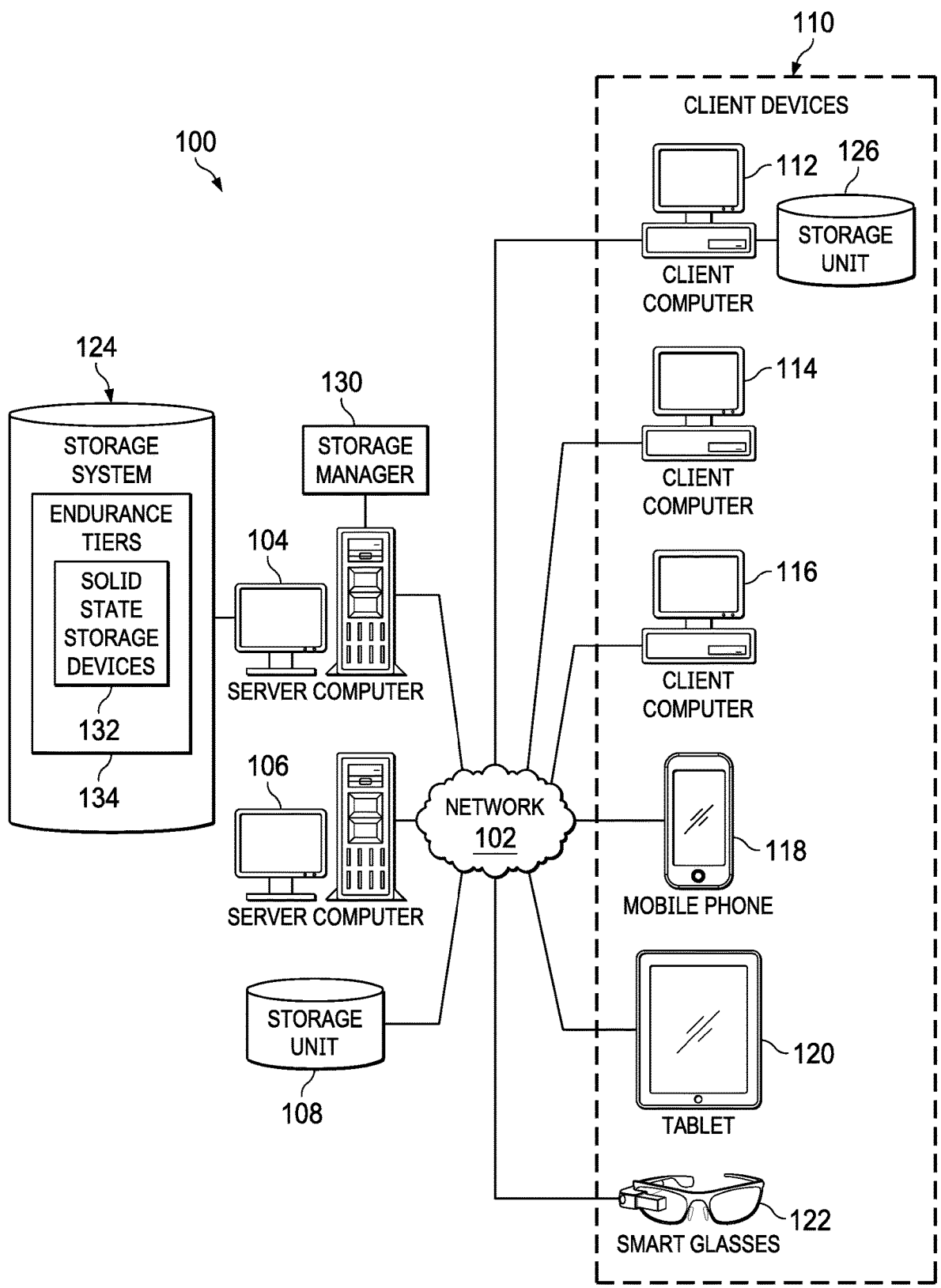
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Illustrative embodiments recognize and take into account a number of different considerations. For example, the illustrative embodiments recognize and take into account that an endurance of a solid state storage device can be described in terms of drive writes per day (DWPD). The illustrative embodiments recognize and take into account that the manufacturer specifies the number of drive writes per day that can be performed and maintain the warranty. The illustrative embodiments recognize and take into account that manufacturers have offered lower endurance options for solid state storage devices in an effort to reduce the cost of these devices. For example, a more economical solid state storage device can have one drive write per day and higher-quality, more expensive solid state storage devices can have five drive writes per day.

The illustrative embodiments recognize and take into account that to avoid having customers take advantage of warranty services, hardware manufacturers will often have the drives fail with a specific error code when the drives have exceeded their write rating. When the drive fails with the error code, the customer is required to pay for the replacement because the drive has been overused. The illustrative embodiments recognize and take into account that this situation causes customers to make decisions at a time of purchase on which type or types of storage to use and which workload to place on them. The decisions on use and workload can be inexact resulting in unnecessary costs or poor usage of the solid state storage devices. The illustrative embodiments recognize and take into account that even if the design is perfectly aligned with actual consumption, placement decisions are still needed at the logical unit number (LUN) and volume level. Those embodiments recognize and take into account that within many workloads, such as relational databases, some portions of the database are much more dynamic than others and therefore generate higher write levels. The illustrative embodiments recognize and take into account that allocating drive space based on volume is too coarse of a selection to avoid placing the less active portions of the volume on a high endurance disk.

The illustrative embodiments recognize and take into account that it would be desirable to have a method and apparatus that take into account at least some of the issues discussed above, as well as other possible issues. For example, it would be desirable to have a method and apparatus that overcome a problem with managing a storage system using solid state storage devices in a manner that reduces situations in writes to solid state storage devices exceeding a manufacturer specified rate for warranty purposes.

Thus, the illustrative embodiments provide a method, apparatus, computer system, and computer program product for managing a storage system. Writes to sections in solid state storage devices in endurance tiers in the storage system are monitored by a computer system over a period of time. Responsive to a write rate for the writes to a section in the sections in an current endurance tier in the endurance tiers exceeding a maximum recommended write rate for the current endurance tier during the period of time, data is moved from the section in the current endurance tier to a higher endurance tier in the endurance tiers having a higher maximum recommended write rate than the maximum recommended write rate for the current endurance tier.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage system 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage system 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the illustrative example, storage system 124 and storage system 126 are also present in network data processing system 100 in addition to storage system 108. As depicted, storage system 124 is connected to server computer 104, and storage system 126 is connected to client computer 112 instead of being connected to network 102.

These storage systems include solid state storage devices (SSSDs). Within a storage system, a solid state storage devices can be organized into hierarchies of endurance tiers in a storage system. Each endurance tier can include a class of storage having a particular maximum write rate specified by a manufacturer.

As depicted, storage manager 130 is located in server computer 104 and operates to manage at least one of storage system 108, storage system 124, and storage system 126. In the illustrative example, storage manager 130 can manage where data is stored in different sections of the solid state storage devices. This management can include moving data written to sections when the writes for that data are greater than some desired threshold based on endurance of the solid state storage devices on which the data is located.

For example, storage manager 130 can monitor writes to sections in solid state storage devices (SSSDs) 132 in endurance tiers 134 in storage system 124 over a period of time. In this depicted example, the period of time can be, for example, three days or four days. Other periods of time can be selected depending on the particular implementation.

When the writes to a section in a solid state storage device in an endurance tier are greater than a recommended maximum write rate for the endurance tier, the data in the section can be moved to a section in a higher endurance tier in endurance tiers 134 having a higher maximum recommended write rate for data. A similar process can be performed to move data to a lower endurance tier when the writes fall below a minimum recommended write rate for a solid state storage device in an endurance tier in endurance tiers 134. Moving data to a lower endurance tier frees up space for data that have higher write rates such that the use of storage space in storage system 124 can be improved or optimized.

As a result, the writing of data to solid state storage devices in at least one of storage system 124, storage system 126, or storage system 108 can be managed in a manner that avoids write rates that exceed the maximum specified by manufacturers. With this type of management of data solid state storage devices, the life of storage devices can be increased and warranties for manufacturers can be maintained by not exceeding the maximum write rates specified for solid state storage devices.

In other illustrative examples, in managing multiple storage systems, storage manager 130 can be in a single location such as server computer 104 or can be distributed to at least one of client computer 112, storage system 108, or in some other computer or data processing system in network data processing system 100. Storage manager 130 can be distributed in which instances of storage manager 130 are located in server computer 104, client computer 112, and storage system 108. In other examples, storage manager 130 can be distributed using a server-client software architecture.

Figure 2:
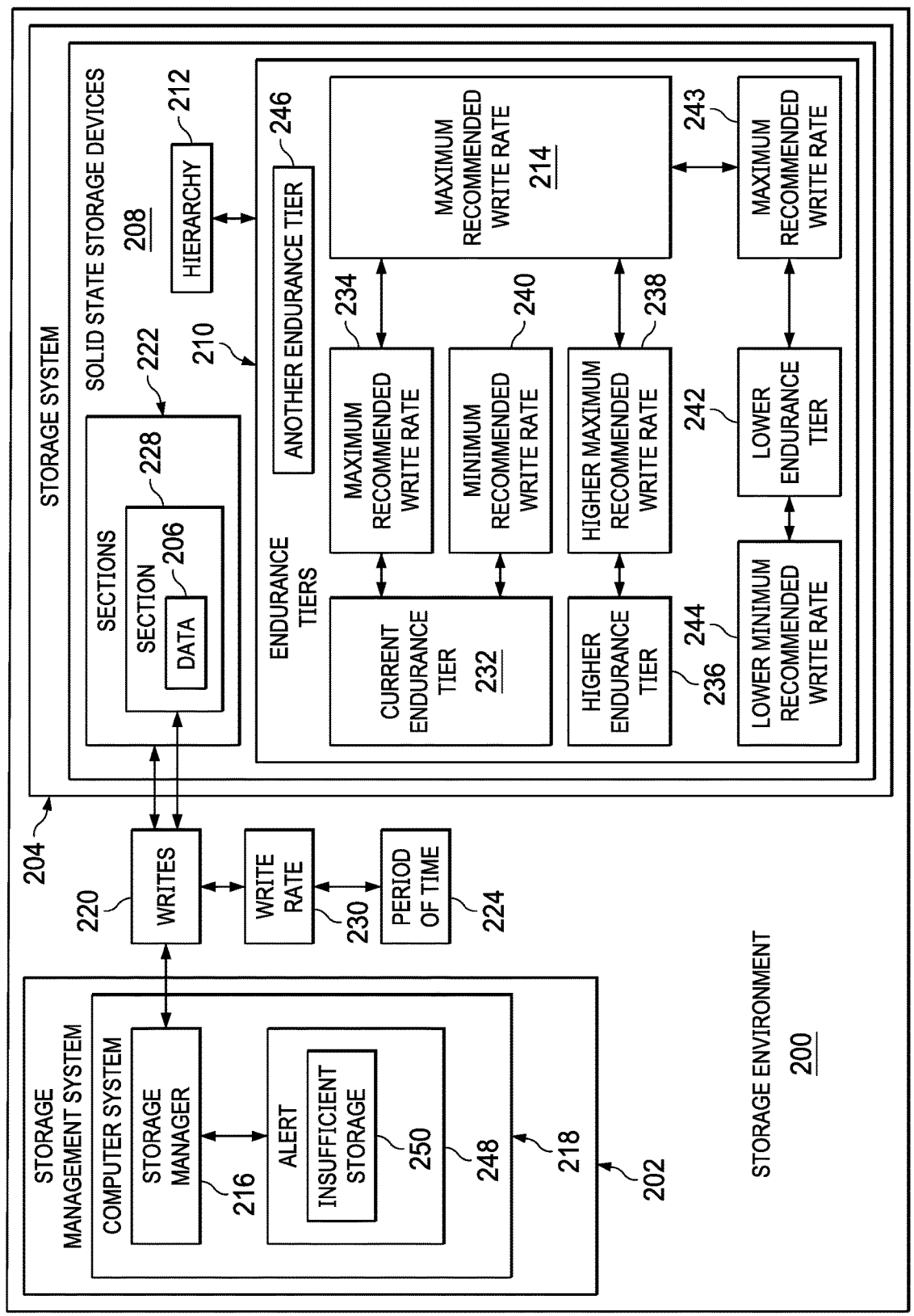
FIG. 2 is a block diagram of a storage environment in accordance with an illustrative embodiment.

With reference now to FIG. 2, a block diagram of a storage environment is depicted in accordance with an illustrative embodiment. In this illustrative example, storage environment 200 includes components that can be implemented in hardware such as the hardware shown in network data processing system 100 in FIG. 1.

In this illustrative example, storage management system 202 manages storage system 204. The management of storage system 204 by storage management system 202 includes at least one of writing, reading, or storing data 206 in storage system 204.

As depicted, storage system 204 comprises solid state storage devices. The solid state storage devices can take a number of different forms. For example, the solid state storage devices can comprise at least one of a solid state disk, a flash drive, or some other suitable type of storage device.

In this illustrative example, solid state storage devices 208 and storage system 204 are in endurance tiers 210. Endurance tiers 210 are organized in hierarchy 212. As depicted, hierarchy 212 of endurance tiers 210 is based on maximum recommended write rates 214 for endurance tiers 210 of solid state storage devices 208 in this example.

Storage management system 202 comprises storage manager 216 in computer system 218. Storage manager 216 is located in computer system 218. Storage manager 216 can be implemented in software, hardware, firmware, or a combination thereof. When software is used, the operations performed by storage manager 216 can be implemented in program code configured to run on hardware, such as a processor unit. When firmware is used, the operations performed by storage manager 216 can be implemented in program code and data and stored in persistent memory to run on a processor unit. When hardware is employed, the hardware may include circuits that operate to perform the operations in storage manager 216.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 218 is a physical hardware system and includes one or more data processing systems. When more than one data processing system is present in computer system 218, those data processing systems are in communication with each other using a communications medium. The communications medium can be a network. The data processing systems can be selected from at least one of a computer, a server computer, a tablet computer, or some other suitable data processing system.

In managing data 206 for storage system 204, storage manager 216 in computer system 218 can manage the storage of data 206 based on writes 220 to solid state storage devices 208 in storage system 204. For example, storage manager 216 can monitor writes 220 to sections 222 in solid state storage devices 208 in endurance tiers 210 in storage system 204 over a period of time.

Sections 222 can take a number of different forms. For example, sections 222 can include at least one of a segment, an extent, a data block, or some other suitable allocation or grouping of storage in a storage device. As depicted, a data block corresponds to a number of bytes of physical space on a disk. An extent is a number of continuous data blocks. A segment is a set of extents in this illustrative example.

Data 206 stored in sections 222 can take a number of different forms. For example, data 206 may be records for a database, an image, an audio file, a spreadsheet, or some other type of data. Data 206 in a particular section may be written to more often depending on the type of data or the use of the data in that particular section. For example, data 206 in the particular section may be for a database written to perform commercial transactions. That particular section may be written to more often as compared to data in the form of an archived document stored in another section in sections 222.

The period of time can take a number of different forms. For example, the period of time can be 10 hours, 33 hours, three days, six days, one week, or some other suitable period of time. Writes 220 can be measured in a number of different ways. For example, writes 220 can be measured as one of a running daily average, an average during the period of time, an aggregate total in the period of time, or some other suitable manner in which writes 220 can be measured.

In monitoring writes 220 to sections 222 in solid state storage device 208, writes 220 to each section in sections 222 are monitored in the illustrative example. These writes can also be referred to as write levels. Responsive to write rate 230 for writes 220 to section 228 in sections 222 in current endurance tier 232 in endurance tiers 210 exceeding maximum recommended write rate 234 for current endurance tier 232 during period of time 224, storage manager 216 moves data 226 from section 228 in current endurance tier 232 to higher endurance tier 236 in endurance tiers 210 having higher maximum recommended write rate 238 than maximum recommended write rate 234 for current endurance tier 232. In this example, data 226 is moved from section 228 to another section in higher endurance tier 236.

As depicted, maximum recommended write rate 234 is a threshold value. Maximum recommended write rates 214 for endurance tiers 210 for solid state storage devices 208 are lower than the maximum write rates specified by a manufacturer of the solid state storage devices. The maximum write rate specified by the manufacturer can be measured, for example, as drive writes per day (DWPD), gigabyte (GB) writes per day, or some other metric. Exceeding this manufacturer specified the write level can void a warranty for the solid state drive.

In the illustrative example, maximum recommended write rates 214 are selected to be lower than the maximum write rates to help avoid warranty issues. For example, a solid state drive can have gigabyte writes per day of 24.6 gigabytes. In other words, storage manager 216 can move data 226 to different sections in sections 222 in a manner that reduces or avoids exceeding maximum write rates specified by a manufacturer in these illustrative examples.

Further, responsive to write rate 230 for writes 220 to section 228 in current endurance tier 232 falling below minimum recommended write rate 240 for current endurance tier 232 during period of time 224, storage manager 216 moves data 226 from section 228 in current endurance tier 232 to lower endurance tier 242 in endurance tiers 210 with lower minimum recommended write rate 244 than minimum recommended write rate 240 for current endurance tier 232. In other words, minimum recommended write rate 244 for lower endurance tier 242 is lower than minimum recommended write rate 240 for current endurance tier 232.

In the illustrative example, lower endurance tier 242 can include solid state storage devices 208 that are more economical or less costly price as compared to solid state storage devices 208 in higher endurance tier 236. As a result, the higher recommended write rates in higher endurance tiers can be saved for data that takes advantage of needs for the higher write rates in the endurance tiers. This type of data management optimizes the use of storage space in storage system 204 in the illustrative example.

In the illustrative example, minimum recommended write rate 240 is selected to move data to a lower tier when the write rates in the current tier are lower than some minimum. In this manner, space can be freed up in the current tier for writing data that have higher write rates than minimum recommended write rate 240. In the illustrative example, minimum recommended write rate 240 for current endurance tier 232 is based on maximum recommended write rate 243 for lower endurance tier 242.

In this illustrative example, lower endurance tier 242 can be an entry-level tier within maximum write rate of 1.0 daily write per day (DWPD) specified by the manufacturer. Current endurance tier 232 can be a mid-level tier with a maximum write rate of 3.0 DWPD specified by the manufacturer. In selecting recommended write rates, it can be desirable to avoid situations where maximum recommended write rate 243 for lower endurance tier 242 is at the cutoff of the maximum write rate specified by the manufacturer for lower endurance tier 242.

With this goal in mind, maximum recommended write rate 243 can be set with a buffer fro r the maximum write rate specified by the manufacturer. For example, the buffer can be 0.15 DWPD, resulting in 0.85 DWPD for maximum recommended write rate 243 for lower endurance tier 242.

In this illustrative example, minimum recommended write rate 240 can be selected to move data 206 from current endurance tier 242 to lower endurance tier 242 in a manner that avoids data 206 being moved up and down between current endurance tier 232 and lower endurance tier 242 at an undesired rate. For example, minimum recommended write rate 240 can be selected as 0.80 DWPD.

When storage manager 216 decides to move data 226 from section 228 in current endurance tier 232 to another endurance tier 246 in endurance tiers 210, storage manager 216 determines whether another endurance tier 226 has sufficient storage to store data 226 currently located in section 228 of current endurance tier 232 in response to another endurance tier 246 being selected to perform a movement of data 226. Storage manager 216 generates alert 248 indicating that insufficient storage 250 is present for the movement of data 226 in response to another endurance tier 246 having insufficient storage 250 for data 226 in section 228 of current endurance tier 232.

In one illustrative example, one or more solutions are present that overcome a problem with managing a storage system using solid state storage devices in a manner that reduces situations in writes to solid state storage devices exceeding a manufacturer specified rate for warranty purposes. As a result, one or more solutions may provide an effect of avoiding writes exceeding manufacturer write rates by monitoring writes and relocating data within endurance tiers of solid state devices having different maximum recommended write rates in a manner that optimizes the use of a storage system without exceeding maximum recommended write rates assigned to different endurance tiers.

Computer system 218 can be configured to perform at least one of the steps, operations, or actions described in the different illustrative examples using software, hardware, firmware, or a combination thereof. As a result, computer system 218 operates as a special purpose computer system in which storage manager 216 in computer system 218 enables managing the writing of data to different solid state storage devices in storage system 204. The grouping of solid state storage device 208 in endurance tiers 210 with hierarchy 212 based on maximum recommended write rates 214 can be used to manage where data 206 is stored in writes 220 to data 206 stored within endurance tiers 210. In particular, storage manager 216 transforms computer system 218 into a special purpose computer system as compared to currently available general computer systems that do not have storage manager 216. As a result, storage manager 216 performs write-based data management using endurance tiers 210 in storage system 204.

In the illustrative example, the use of storage manager 216 in computer system 218 integrates processes into a practical application for a method of managing storage systems that increases the performance of computer system 218. In other words, storage manager 216 in computer system 218 is directed to a practical application of processes integrated into storage manager 216 in computer system 218 that monitors writes 220 to solid state storage devices 208 organized in endurance tiers 210 having hierarchy 212 in which hierarchy 212 is based on maximum recommended write rates 214. Writes 220 to sections 222 in endurance tiers 210 are monitored in the illustrative example. When writes for a section exceed maximum recommended write rates for a particular endurance tier, the data in that section can be moved to another endurance tier in the hierarchy having a higher maximum recommended write rate that is sufficient for the rate detected.

As a result, exceeding manufacture write rates can be avoided. By not exceeding manufacturer write rates, the life of solid state storage devices 208 in storage system 204 can be increased and the voiding of warranties for solid state storage devices 208 can be reduced or avoided. In this manner, storage manager 216 in computer system 218 provides a practical application of managing writes to storage devices such that the functioning of computer system 218 is improved. As a result, undesired and unexpected failures in storage solid state storage devices 208 can be reduced using storage manager 216 to manage writes 220 of data 206 to solid state storage devices 208. As a result, the reliability of computer system 218 with respect to storing data 206 can be improved as compared to current computer systems that do not employ storage manager 216.

Additionally, a reduction in expense can be realized by users or customers employing storage manager 216 to manage storage system 204 in contrast to the current practice of users having to predict or guess at average write levels across a broad workload and using right leveling algorithms within the solid state drives to manage usage of those drives. Current techniques for a large-scale redundant array of inexpensive disks (RAID) sets using distributed RAID (DRAID) and other similar technologies rely on hotspots being spread across multiple drives as a side effect of RAID usage. Storage manager 216 can manage workloads more efficiently and in a more cost-effective manner.

In one example, a backup application can utilize a relational database management system (RDMS) such as Db2 to store metadata. This type of implementation can require the use of performance of solid state storage devices. The backup data can have a much lower write rate as compared to the metadata. The primary writes for the backup data can be related to de-duplication metadata tracking. With current implementations, backup data and metadata are placed on the same RAID array. The solid state disks for the RAID array are selected to support the higher level of writes for the metadata.

Current storage systems do not consider using separate RAID arrays in the same storage system for moving data. As a result, with the current techniques, higher performance storage arrays are used when only a small portion of the data needs the higher write rates. The illustrative examples recognize and take into account that write wear overload can be avoided by placing data on a different RAID arrays in the same storage system in which the RAID arrays can be endurance tiers.

With storage manager 216, the writing of these different types of data can be managed using solid state storage devices 208 organized in endurance tiers 210. As a result, metadata can be written in a higher endurance tier as compared to the backup data. In the illustrative example, the monitoring of writes by storage manager 216 are performed on a set volume level, such as sections in the form of extensor segments.

In this example implementation, storage manager 216 can automatically move or migrate data, such as metadata or backup data, based on write rates without needing user input or specific provisioning of solid state drives for particular types of data. With this type of implementation, each metadata and backup data can be placed in different endurance tiers. Storage manager 216 can be configured to track writes of data within a period of time that is selected to focus on longer-term writes such as a week as compared to writes performed within a shorter period of time such as the past day.

The illustration of storage environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, storage manager 216 can be used to manage one or more storage systems in addition to or in place of storage system 204. Further, storage system 204 is shown in a single block. Solid state storage devices 208 can be located in the same physical location or distributed in different locations depending on the particular implementation. Further, the moving of data based on a minimum recommended write rate is an optional feature and may not be implemented in storage manager 216 in some illustrative examples. Further, in monitoring writes 220 to section 228, storage manager 216 may monitor writes 220 in other sections in sections 222. These other sections may be monitored in conjunction with section 228 such that data 226 in the sections can be moved to another endurance tier as a group when one of the sections exceeds a maximum recommended write rate even though other sections may not exceed the maximum recommended write rate. Further, storage manager 216 can operate to manage many different types of storage systems and applications for storage systems.

Figure 3:
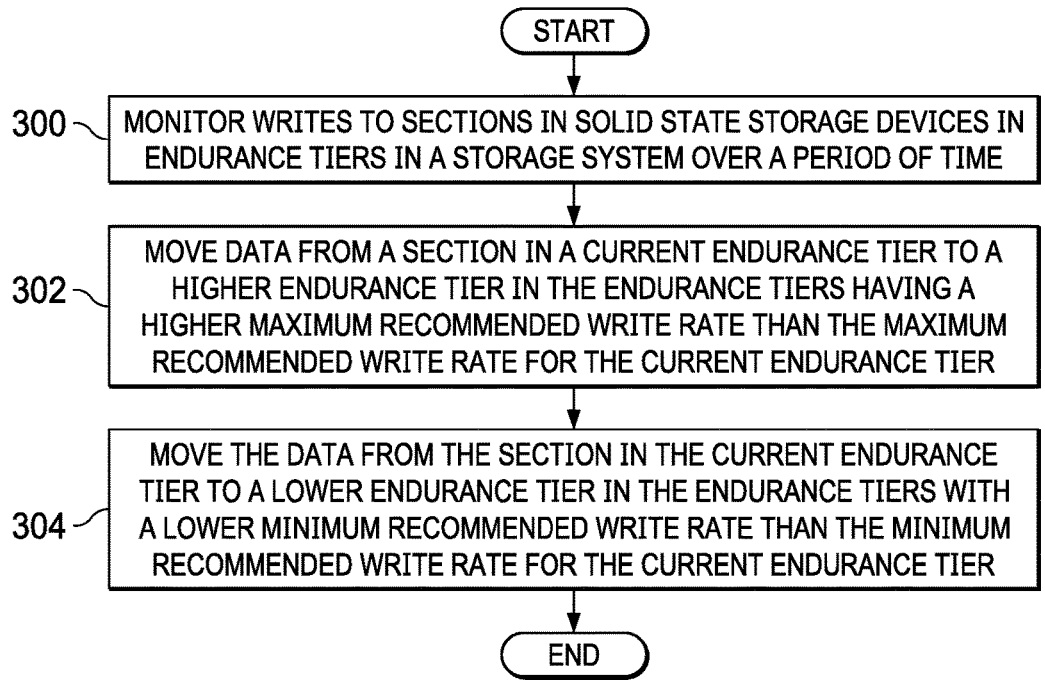
FIG. 3 is a flowchart of a process for managing a storage system in accordance with an illustrative embodiment.

Turning next to FIG. 3, a flowchart of a process for managing a storage system is depicted in accordance with an illustrative embodiment. The process in FIG. 3 can be implemented in hardware, software, or both. When implemented in software, the process can take the form of program code that is run by one or more processor units located in one or more hardware devices in one or more computer systems. For example, the process can be implemented in storage manager 216 in computer system 218 in FIG. 2.

The process begins by monitoring writes to sections in solid state storage devices in endurance tiers in a storage system over a period of time (operation 300). Responsive to a write rate for the writes to a section in the sections in a current endurance tier in the endurance tiers exceeding a maximum recommended write rate for the current endurance tier during the period of time, the process moves data from a section in a current endurance tier to a higher endurance tier in the endurance tiers having a higher maximum recommended write rate than the maximum recommended write rate for the current endurance tier (operation 302).

Responsive to the write rate for the writes to the section in the current endurance tier falling below a minimum recommended write rate for the current endurance tier during the period of time, the process moves the data from the section in the current endurance tier to a lower endurance tier in the endurance tiers with a lower minimum recommended write rate than the minimum recommended write rate for the current endurance tier (operation 304). The process terminates thereafter.

Figure 4:
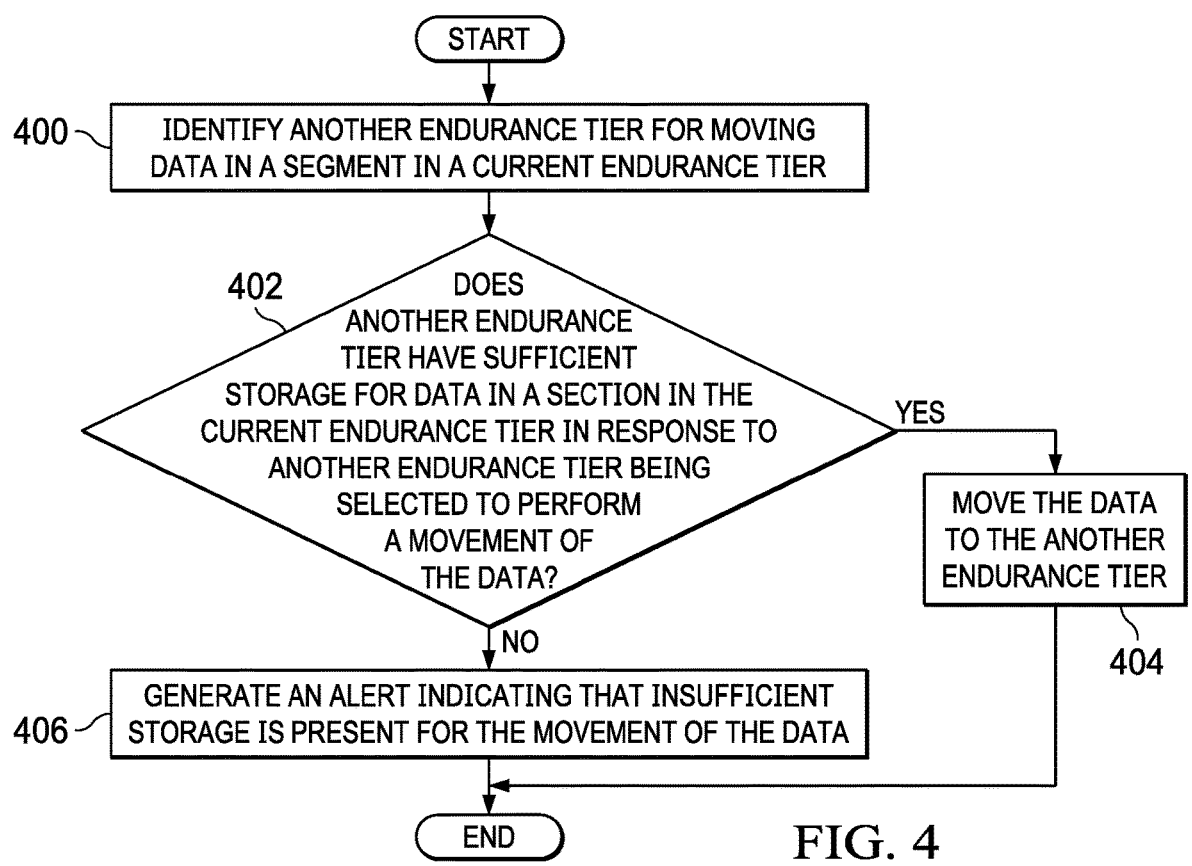
FIG. 4 is a flowchart of a process for moving data to another endurance tier in accordance with an illustrative embodiment.

With reference next to FIG. 4, a flowchart of a process for moving data to another endurance tier is depicted in accordance with an illustrative embodiment. The process in FIG. 4 can be implemented in hardware, software, or both. When implemented in software, the process can take the form of program code that is run by one or more processor units located in one or more hardware devices in one or more computer systems. For example, the process can be implemented in storage manager 216 in computer system 218 in FIG. 2. The process in this flowchart can be used to move data to a higher endurance tier such as in operation 302 or a lower endurance tier such as in operation 304 in FIG. 3.

The process begins by identifying another endurance tier for moving data in a segment in a current endurance tier (operation 400). The endurance tier can be a higher endurance tier or a lower endurance tier.

The process determines whether another endurance tier has sufficient storage for data in the section in the current endurance tier in response to another endurance tier being selected to perform a movement of the data (operation 402). If sufficient space is present, the process moves the data to the another endurance tier (operation 404). The process terminates thereafter.

Otherwise, the process generates an alert indicating that insufficient storage is present for the movement of the data (operation 406) with the process terminating thereafter. Operation 406 is performed in response to the another endurance tier having the insufficient storage for the data in the section in the current endurance tier.

Figure 5:
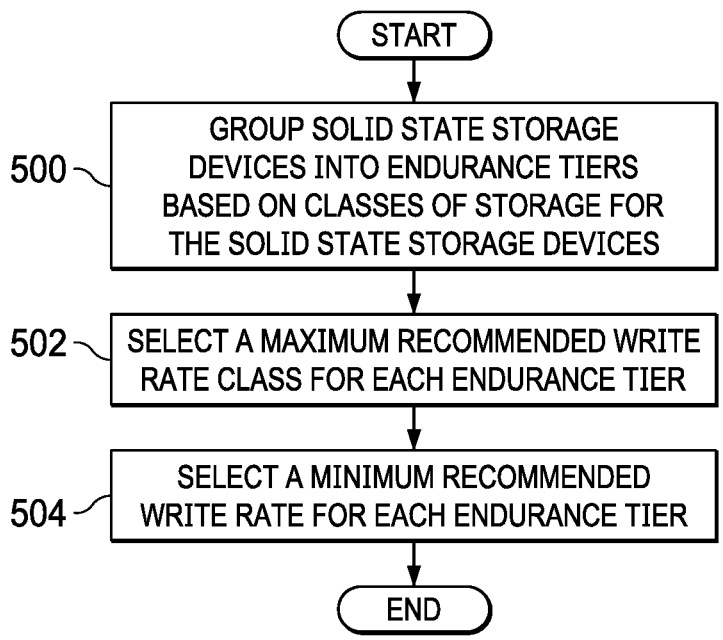
FIG. 5 is a flowchart of a process for configuring a storage system in accordance with an illustrative embodiment.

With reference next to FIG. 5, a flowchart of a process for configuring a storage system is depicted in accordance with an illustrative embodiment. The process in FIG. 5 can be implemented in hardware, software, or both. When implemented in software, the process can take the form of program code that is run by one or more processor units located in one or more hardware devices in one or more computer systems. For example, the process can be implemented in storage manager 216 in computer system 218 in FIG. 2. This process can be used to configure or reconfigure solid state storage devices 208 into endurance tiers 210 for storage system 204.

The process begins by grouping solid state storage devices into endurance tiers based on classes of storage for the solid state storage devices (step 500). The classes are based on maximum write rates specified by a manufacturer. In this example, the solid state storage devices in an endurance tier all have the same maximum write rates. In some illustrative examples, the storage devices in the endurance tier could have write rates that vary within a range.

The process selects a maximum recommended write rate class for each endurance tier (step 502). These maximum recommended write rates are selected as being below the maximum write rate specified by the manufacturer.

The process selects a minimum recommended write rate for each endurance tier (step 504). The process terminates thereafter. In step 504, the minimum recommended write rate can be based on the maximum write rates of lower endurance classes with a percentage threshold as a buffer. The percentage threshold provides some difference between the classes. The selection of the buffer can be made to avoid data with fluctuating write rates that do not exceed the maximum recommended write rate in the endurance tier in which the data is located and to avoid excess movement of the same piece of data back and forth between the endurance tiers.

Figure 6:
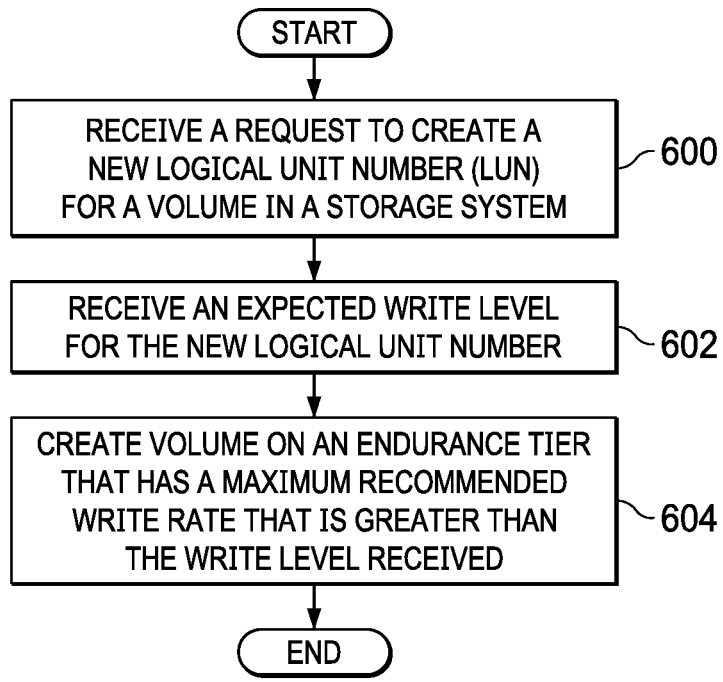
FIG. 6 is a flowchart of a process for provisioning a storage system in accordance with an illustrative embodiment.

Turning now to FIG. 6, a flowchart of a process for provisioning a storage system is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in storage manager 216 in computer system 218 in FIG. 2. This process can be used to provision solid state storage devices 208 in storage system 204 in FIG. 2.

The process begins by receiving a request to create a new logical unit number (LUN) for a volume in a storage system (step 600). In this example, the request can also indicate the performance is at the level provided by a solid state storage device instead of a device that uses a spinning disk.

The process receives an expected write level for the new logical unit number (step 602). In step 602, the write level can be the amount of data expected to be written to the logical unit number on a daily basis.

The process creates volume on an endurance tier that has a maximum recommended write rate that is greater than the write level received (step 604). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 7:
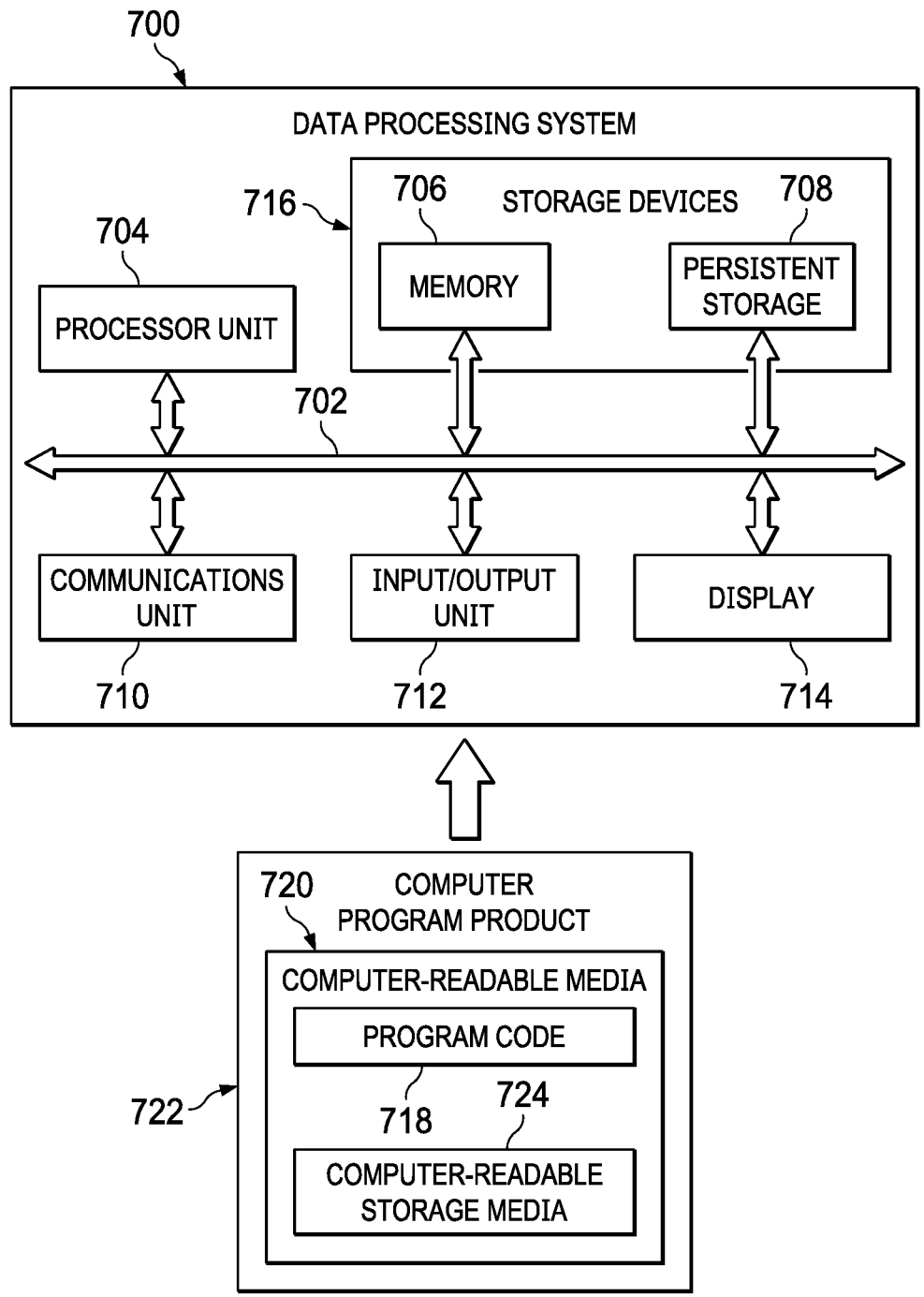
FIG. 7 is a block diagram of a data processing system in accordance with an illustrative embodiment.

Turning now to FIG. 7, a block diagram of a data processing system is depicted in accordance with an illustrative embodiment. Data processing system 700 can be used to implement server computer 104, server computer 106, client devices 110, in FIG. 1. Data processing system 700 can also be used to implement computer system 218 in FIG. 2. In this illustrative example, data processing system 700 includes communications framework 702, which provides communications between processor unit 704, memory 706, persistent storage 708, communications unit 710, input/output (I/O) unit 712, and display 714. In this example, communications framework 702 takes the form of a bus system.

Processor unit 704 serves to execute instructions for software that can be loaded into memory 706. Processor unit 704 includes one or more processors. For example, processor unit 704 can be selected from at least one of a multicore processor, a central processing unit (CPU), a graphics processing unit (GPU), a physics processing unit (PPU), a digital signal processor (DSP), a network processor, or some other suitable type of processor. Further, processor unit 704 can may be implemented using one or more heterogeneous processor systems in which a main processor is present with secondary processors on a single chip. As another illustrative example, processor unit 704 can be a symmetric multiprocessor system containing multiple processors of the same type on a single chip.

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, can be, for example, a random-access memory or any other suitable volatile or non-volatile storage device. Persistent storage 708 may take various forms, depending on the particular implementation.

For example, persistent storage 708 may contain one or more components or devices. For example, persistent storage 708 can be a hard drive, a solid-state drive (SSD), a flash memory, a rewritable optical disk, a rewritable magnetic tape, or some combination of the above. The media used by persistent storage 708 also can be removable. For example, a removable hard drive can be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that can be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs can be located in storage devices 716, which are in communication with processor unit 704 through communications framework 702. The processes of the different embodiments can be performed by processor unit 704 using computer-implemented instructions, which may be located in a memory, such as memory 706.

These instructions are referred to as program code, computer usable program code, or computer-readable program code that can be read and executed by a processor in processor unit 704. The program code in the different embodiments can be embodied on different physical or computer-readable storage media, such as memory 706 or persistent storage 708.

Program code 718 is located in a functional form on computer-readable media 720 that is selectively removable and can be loaded onto or transferred to data processing system 700 for execution by processor unit 704. Program code 718 and computer-readable media 720 form computer program product 722 in these illustrative examples. In the illustrative example, computer-readable media 720 is computer-readable storage media 724.

In these illustrative examples, computer-readable storage media 724 is a physical or tangible storage device used to store program code 718 rather than a medium that propagates or transmits program code 718.

Alternatively, program code 718 can be transferred to data processing system 700 using a computer-readable signal media. The computer-readable signal media can be, for example, a propagated data signal containing program code 718. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 720" can be singular or plural. For example, program code 718 can be located in computer-readable media 720 in the form of a single storage device or system. In another example, program code 718 can be located in computer-readable media 720 that is distributed in multiple data processing systems. In other words, some instructions in program code 718 can be located in one data processing system while other instructions in in program code 718 can be located in one data processing system. For example, a portion of program code 718 can be located in computer-readable media 720 in a server computer while another portion of program code 718 can be located in computer-readable media 720 located in a set of client computers.

The different components illustrated for data processing system 700 are not meant to provide architectural limitations to the manner in which different embodiments can be implemented. In some illustrative examples, one or more of the components may be incorporated in or otherwise form a portion of, another component. For example, memory 706, or portions thereof, may be incorporated in processor unit 704 in some illustrative examples. The different illustrative embodiments can be implemented in a data processing system including components in addition to or in place of those illustrated for data processing system 700. Other components shown in FIG. 7 can be varied from the illustrative examples shown. The different embodiments can be implemented using any hardware device or system capable of running program code 718.

Thus, illustrative embodiments of the present invention provide a computer-implemented method, computer system, and computer program product for managing a storage system. Writes to sections in solid state storage devices in endurance tiers in the storage system are monitored by a computer system over a period of time. Responsive to a write rate for the writes to a section in the sections in a current endurance tier in the endurance tiers exceeding a maximum recommended write rate for the current endurance tier during the period of time, data is moved from the section in the current endurance tier to a higher endurance tier in the endurance tiers having a higher maximum recommended write rate than the maximum recommended write rate for the current endurance tier.

In one illustrative example, a storage manager in a computer system is directed to a practical application of processes integrated into the storage manager to monitor writes to solid state storage devices organized in endurance tiers having a hierarchy in which the hierarchy is based on maximum recommended write rates for the solid state storage devices. When writes for a section exceed a maximum recommended write rate for a particular endurance tier, the data in that section can be moved to another endurance tier in the hierarchy having a higher maximum recommended write rate that is sufficient for the rate detected. The data with higher write rates can be moved to higher endurance tiers and, in a similar fashion, data with writes can be moved to lower endurance tiers.

As a result, exceeding manufacturer write rates can be avoided using a storage manager as shown in the illustrative example. By not exceeding manufacturer write rates, the life of the solid state storage devices in a storage system can be extended and the voiding of warranties for the solid state storage devices can be avoided. Further, this also reduces the amount of effort needed to organize solid state storage devices based on particular uses for expected writes to the storage system. Instead, the storage manager can manage the deduplication data within the storage system based on the writes and maximum recommended write rates the solid state storage devices.

Further, in the illustrative examples, undesired and unexpected failures in solid state storage devices can be reduced or avoided using a storage manager as shown in the illustrative example to manage writes of data to the solid state storage devices. Further, the reliability of the computer system with respect to storing data can be improved as compared to current computer systems that do not employ storage manager as described in the illustrative examples. This type of management of data using endurance tiers with maximum recommended write rates can take into variations and uses for individual volumes and can also provide increased granular management of where particular solid state devices are placed into different endurance tiers.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for managing a storage system, the method comprising:
   monitoring, by a computer system, writes to sections in solid state storage devices in endurance tiers in the storage system over a period of time;
   responsive to a write rate for the writes to a section in the sections in an current endurance tier in the endurance tiers exceeding a maximum recommended write rate for the current endurance tier during the period of time, moving data from the section in the current endurance tier to a higher endurance tier in the endurance tiers having a higher maximum recommended write rate than the maximum recommended write rate for the current endurance tier; and
   responsive to the write rate for the writes to the section in the current endurance tier falling below a minimum recommended write rate for the current endurance tier during the period of time, moving the data from the section in the current endurance tier to a lower endurance tier in the endurance tiers with a lower minimum recommended write rate than the minimum recommended write rate for the current endurance tier.

2. The method of claim 1, further comprising:
   determining whether another endurance tier has sufficient storage for data in the section in the current endurance tier in response to another endurance tier being selected to perform a movement of the data; and
   generating an alert indicating that insufficient storage is present for the movement of the data in response to the another endurance tier having the insufficient storage for the data in the section in the current endurance tier.

3. The method of claim 1, wherein the writes measured as one of a running daily average, an average during the period of time, or an aggregate total for the period of time.

4. The method of claim 1, wherein the maximum recommended write rates are lower than the maximum write rate specified by a manufacturer of the solid state storage devices in the current endurance tier.

5. The method of claim 1, wherein the minimum recommended write rate for the current endurance tier is based on the maximum recommended write rate of the lower endurance tier.

6. The method of claim 1, wherein the section is selected from one of a segment, an extent, and a data block, and further comprising:
   receiving a request to create a new logical unit number for a volume in the storage system;
   receiving an expected write level for the new logical unit number; and
   creating the volume on an endurance tier of the endurance tiers that has a maximum recommended write rate that is greater than the received expected write level for the new logical unit number.

7. The method of claim 1, wherein the solid state storage devices in the endurance tiers are selected from at least one of a solid state disk or a flash drive, and further comprising:
   grouping the solid state storage devices in the endurance tiers based on maximum recommended write rates for the solid state storage devices specified by at least one manufacturer of the solid state storage devices; and
   selecting a minimum recommended write rate for the each endurance tier that is below the maximum recommended write rate for the each endurance tier.

8. A storage management system comprising:
   a computer system that monitors writes to sections in solid state storage devices in endurance tiers of in a storage system over a period of time and responsive to a write rate for the writes to a section in the sections in an current endurance tier in the endurance tiers exceeding a maximum recommended write rate for the current endurance tier during the period of time, moves data from the section in the current endurance tier to a higher endurance tier in the endurance tiers having a higher maximum recommended write rate than the maximum recommended write rate for the current endurance tier, wherein the computer system, responsive to the write rate for the writes to the section in the current endurance tier falling below a minimum recommended write rate for the current endurance tier during the period of time, moves the data from the section in the current endurance tier to a lower endurance tier in the endurance tiers with a lower minimum recommended write rate than the minimum recommended write rate for the current endurance tier.

9. The storage management system of claim 8, wherein the computer system determines whether another endurance tier has sufficient storage for the data in the section in the current endurance tier in response to another endurance tier being selected to perform a movement of the data; and generates an alert indicating that insufficient storage is present for the movement of the data in response to the another endurance tier having the insufficient storage for the data in section in the current endurance tier.

10. The storage management system of claim 8, wherein the writes are measured as one of a running daily average, an average during the period of time, or an aggregate total for the period of time.

11. The storage management system of claim 8, wherein the maximum recommended write rates are lower than the maximum write rate specified by a manufacturer of the solid state storage devices in current endurance tier.

12. The storage management system of claim 8, wherein the minimum recommended write rate for the current endurance tier is based on the maximum recommended write rate of the lower endurance tier.

13. The storage management system of claim 8, wherein the section is selected from one of a segment, an extent, and a data block, and further comprising:
   receiving a request to create a new logical unit number for a volume in the storage system;
   receiving an expected write level for the new logical unit number; and
   creating the volume on an endurance tier of the endurance tiers that has a maximum recommended write rate that is greater than the received expected write level for the new logical unit number.

14. The storage management system of claim 8, wherein the solid state storage devices in the endurance tiers are selected from at least one of a solid state disk or a flash drive, and further comprising:
   grouping the solid state storage devices in the endurance tiers based on maximum recommended write rates for the solid state storage devices specified by at least one manufacturer of the solid state storage devices; and
   selecting a minimum recommended write rate for the each endurance tier that is below the maximum recommended write rate for the each endurance tier.

15. A computer program product for managing a storage system, the computer program product comprising:
   a computer-readable storage media;
   first program code, stored on the computer-readable storage media, executable by a computer system to cause the computer system to monitor writes to sections in solid state storage devices in endurance tiers of in the storage system over a period of time;
   second program code, stored on the computer-readable storage media, executable by a computer system to cause the computer system to move data from a section in the sections in a current endurance tier to a higher endurance tier in the endurance tiers having a higher maximum recommended write rate than a maximum recommended write rate for the current endurance tier in response to the write rate for the writes to the section exceeding the maximum recommended write rate for the current endurance tier during the period of time; and
   third program code, stored on the computer-readable storage media, executable by a computer system to cause the computer system to move the data from the section in the current endurance tier to a lower endurance tier in the endurance tiers with a lower minimum recommended write rate than a minimum recommended write rate for the current endurance tier in response to the write rate for the writes to the section in the current endurance tier falling below the minimum recommended write rate for the current endurance tier during the period of time.

16. The computer program product of claim 15, further comprising:
   third program code, stored on the computer-readable storage media, executable by a computer system to cause the computer system to determine whether another endurance tier has sufficient storage for the data in the section in the current endurance tier in response to another endurance tier being selected to perform a movement of the data; and
   fourth program code, stored on the computer-readable storage media, executable by a computer system to cause the computer system to generate an alert indicating that insufficient storage is present for the movement of the data in response to the another endurance tier having the insufficient storage for the data in section in the current endurance tier.

17. The computer program product of claim 15, wherein the writes are measured as one of a running daily average, an average during the period of time, or an aggregate total for the period of time.

* * * * *